United States Patent [19]

Somerville et al.

[11] Patent Number: 4,875,905
[45] Date of Patent: Oct. 24, 1989

[54] METHOD OF PREPARING A HIGH HEATING VALUE FUEL PRODUCT

[75] Inventors: Robin Somerville, Galveston, Tex.; Liang-Tseng Fan, Manhattan, Kans.

[73] Assignee: Solidiwaste Technology, L.P., Manhattan, Kans.

[21] Appl. No.: 270,040

[22] Filed: Nov. 14, 1988

[51] Int. Cl.$^4$ .................................................. C10L 5/40
[52] U.S. Cl. ..................................... 44/589; 44/16 A; 44/15 R; 44/605
[58] Field of Search .................. 44/16 A, 16 B, 15 R, 44/601, 589, 605

[56] References Cited

U.S. PATENT DOCUMENTS

| | | | |
|---|---|---|---|
| 4,230,460 | 10/1980 | Maust, Jr. | 44/589 |
| 4,326,854 | 4/1982 | Tanner | 44/589 |
| 4,778,615 | 10/1988 | Jeglic | 44/601 |

FOREIGN PATENT DOCUMENTS

| | | | |
|---|---|---|---|
| 227978 | 12/1984 | Japan | 44/16 A |
| 414361 | 7/1934 | United Kingdom | 44/16 B |

*Primary Examiner*—Carl F. Dees
*Attorney, Agent, or Firm*—Harrison & Egbert

[57] ABSTRACT

A method of preparing a high heating value fuel product that comprises the steps of blending a high heating value sludge material with a cellulosic material, adding a microencapsulation reagent to the blended mixture of the sludge and the cellulosic material, introducing a pozzolanic agent to the blended mixture for controlling the rate of solidification, and forming the blended mixture into a form suitable for handling. The sludge is a material having a heating value of greater than 7,000 BTU. This sludge may be a complex mixture of organic hazardous waste streams. The cellulosic material is a silica-containing particulate material having a high heating value. The microencapsulating reagent is a mixture having a 4-15 weight percent of a chemical selected from the group of triethylene glycol, diethylene glycol, and glycerin propylene glycol. The microencapsulation reagent further may include a 20-32 weight percent calcium chloride solution. The pozzolanic agent is added to the mixture at a constant rate. The step of forming includes extruding the blended mixture into a plurality of pellets.

20 Claims, No Drawings

METHOD OF PREPARING A HIGH HEATING VALUE FUEL PRODUCT

TECHNICAL FIELD

The present invention relates to processes for the formation of fuel products. More particularly, the present invention relates to processes utilizing hazardous and non-hazardous waste streams so as to produce a suitable fuel product.

BACKGROUND ART

In a pilot study of the petrochemical industry, it was discovered that most of the hazardous and non-hazardous waste steams produced contained high BTU values. Most of these wastes, however, are disposed of in landfills or by incineration. The National Priorities List of Hazardous Waste Sites shows an abundance of sites with relatively high BTU value wastes.

There is an increasing trend for many producers of high heating value wastes to resort to commercially operating cement and lime kilns for ultimate disposal of such waste. The Environmental Protection Agency has already initiated a similar effort in the Fuels Project. This project currently disposes only of liquid wastes with high BTU value. Presently, certain companies provide safe disposal service for combustable liquid waste producers.

Most cement kilns accepting these wastes can use only liquid fuels. The normal criterion for acceptance of waste is that the heating value of the waste exceed 10,000 BTU per pound. Cement kilns come in four basic configurations that represent an evolutionary scale toward increasing energy efficiency. The four types are: wet process, long dry, preheater, and precalcinating. Although cement kilns function as excellent incinerators these kilns burning hazardous wastes have emphasized the resource recovery nature of this practice and operate as industrial furnaces which burn waste for energy and resource recovery.

Cement kilns have huge appetites for fuel and raw materials. A relatively small wet process kiln, for example, may consume forty-three tons dry weight of feed stock, six thousand five hundred gallons of water, and one hundred seventy million BTU to produce thirty tons per hour of clinker. Such apparent inefficiencies can lead to the demise of similar wet kilns in today's energy conscious times. However, the liabilities of this old, wet process kiln can become assets when the kiln is used to co-process wastes. Cement kilns offer the tremendous advantage of being able to utilized many diverse types of wastes for their energy content and/or resource value.

Cement kilns have been established as effective devices for energy recovery while burning liquid waste for fuel. However, there are equally important opportunities for the utilization of other waste products.

In general, industrial wastes contain numerous inorganics, but are low in organics. These are introduced into the cool end of the kiln as components of the slurry. Also, certain waste waters that are low in organics also can be used to displace water in the formation of this slurry. Many metal bearing wastes are also compatible with cement making. Iron and aluminum are normal cement constituents, but other heavy metals also will become bound in the crystalline structure of the clinker. Lead and zinc are eliminated mainly in dust as opposed to clinker when the kiln is fired with halogenated fuels. Halogens can have positive influences in the kiln by removing sodium and potassium, for example. This occurs because the alkaline salts have boiling points lower than the temperature in the burning zone of the kiln. The volatile potassium and sodium salts are condensed in the air stream in cooler regions of the kiln and are removed as kiln dust. Fluroide may enter into the clinkering reaction as a flux and thus serves as a burning aid.

In the past, it has been very difficult to utilize waste solids in cement kilns. Kilns that have tried to burn these wastes have encountered problems with the handling and the feeding of the kilns. It is especially difficult when the solids or sludges contain a high level of organic and hazardous constituents in the wastes. In such situations, the natural vapor emission from such organic and hazardous constituents would prevent their use in the cement kiln. It becomes very difficult to control the migration of pollutants from the fuel product.

It is an object of the present invention to provide a process for the manufacture of a fuel product that allows high BTU waste products to be utilized as a fuel product.

It is another object of the present invention to provide a process that allows commercially operating kilns to receive hazardous and non-hazardous sludges and wastes in solid form.

It is another object of the present invention to provide a process that enhances the cross-linking and microencapsulation of organic constituents within the wastes.

It is still a further object of the present invention to provide a process that enhances the ability to handle and utilize a fuel product.

These and other objects and advantages of the present invention will become apparent from a reading of the attached specification and appended claims.

SUMMARY OF THE INVENTION

The present invention is a method of preparing a high heating value fuel product that comprises the steps of: (1) blending a high heating value waste material with a cellulosic material; (2) adding a microencapsulation reagent to this blended mixture of waste material and cellulosic material; (3) introducing a pozzolanic agent to the blended mixture for controlling the rate of solidification; and (4) forming the blended mixture into a form suitable for handling.

The high heating value waste material should be a material having a heating value of greater than seven thousand BTU. This waste material can be a complex mixture of organic and hazardous waste streams. Although it is preferable that this waste material be a sludge or a liquid, experimentation with the present invention has indicated that it can be used on fine particulate waste.

The cellulosic material should also be a particulate material having a high heating value. In particular, the cellulosic material should have a size suitable to allow at least eighty percent of the material to pass through a ten mesh seive. This cellulosic material can be rice hulls, wood shavings, sawdust, ground corncobs, grain dust, cotton gin waste, or similar material.

The microencapsulation reagent is introduced to promote cross-linking within the blend and microencapsulation of wastes. In particular, it reduces the emissions of vapors of the organic and hazardous constituents in the wastes (e.g. solvents). This microencapsulation reagent is a mixture having a 4-15 weight percent (4-15 wt. %) of a chemical selected from the group consisting of: triethylene glycol, diethylene glycol, glycerin propylene glycol. Additionally, the microencapsulation reagent may further comprise a 20-32 weight percent (20-32 wt. %) of a calcium chloride solution.

The pozzolanic agent is added to the mixture at a constant rate. This pozzolanic acid may be cement kiln dust or fly ash.

The step of forming of the process of the present invention includes the step of extruding the blended mixture into a plurality of pellets. Additionally, this plurality of pellets may be coated with the pozzolanic coating and cured so as to attain a desired structural strength.

DETAILED DESCRIPTION OF THE INVENTION

The present invention is a method of preparing a fuel product that comprises the basic steps of: (1) blending a mixture of an organic hazardous waste stream with a cellulosic material; (2) adding a cross-linking reagent to the mixture; (3) blending the mixture and the cross-linking reagent such that the organics in the hazardous waste stream are contained therewithin; (4) forming the blended mixture into a form suitable for handling. The purpose of this process is to combine the benefits of various hazardous and waste materials so as to produce an acceptable supplemental fuel for coal piles. In particular, the present invention permits some liquids and sludges hitherto unusable under EPA requirements to be employed in cement kilns in similar facilities.

The initial step of the present invention involves blending a high heating value waste material with a cellulosic material. The high heating value waste material may be solids (sludges), liquids, or mixed. An example of a suitable sludge is found in oil tank bottoms. Typically oil tank bottoms contain ten to twenty percent (10-20%) crude product and eighty to ninety percent (80-90%) sludge. Also, activated carbon particles or ion exchange resins used as scrubbers in canisters and columns may be used as a high heating value waste material. A wide variety of other high heating value wastes exists and can be used by the present invention. The major purpose of the present inventions to allow a high heating value waste material, that would be otherwise unusable, to be utilized as a fuel supplement and as a partial replacement for coal and related fuels.

This high heating value waste material should be material having a heating value of greater than seven thousand BTU per pound. It is believed that the economics of the waste material and its use in the present invention are significantly reduced when the heating value of the waste falls below seven thousand BTU. In particular, the present invention is greatly useful where the waste material is a complex mixture of organic hazardous waste streams.

This high heating value waste material is mechanically blended with a cellulosic material. The cellulosic material should also have a relatively high heating value. Typical cellulosic particulate materials that have high heating values include rice hulls, wood shavings, ground corncobs, grain dust, and similar material. When used in cement kilns, it is preferable to utilize rice hulls or wood chips because they contain silicas. Silicas are part of the natural feed stock for the cement kiln. With regard to sawdust, it is important that the sawdust or other ground material have a size suitable to allow at least eighty percent to pass through a ten mesh seive. During experimentation, it appears that the oxygen demand in the kiln is extremely high when large amounts of sawdut are introduced. This creates some difficulties with fluctuations in kiln temperatures. In addition, it has been found that when sawdust is of an irregular size, certain cut-offs on supplies occurred. When too much sawdust is blended with the waste material, the sawdust ceases to be pliable and is unable to go through hammer mills so as to be ground down. To accommodate this problem, it is necessary to use rice hulls or to grind the wood shavings so as to allow at least eighty percent to pass through a two hundred mesh sieve.

As the cellulosic material and the high heating value waste material are mechanically blended, it is necessary to introduce a microencapsulation reagent to this blended mixture. The purpose of this reagent is to promote cross-linking within the blend and the microencapsulation of wastes. The reagent also reduces emissions of vapors of some of the organic and hazardous constituents in the wastes.

The microencapsulating reagent is a mixture having a 4-15 weight percent (4-15 wt. %) of a chemical selected from the group consisting of triethylene glycol, diethylene glycol, or glycerin propylene glycol. Additionally, a 20-32 weight percent (20-32 wt. %) calcium chloride solution may be another component of the microencapsulating reagent.

Following the addition of a microencapsulating reagent, a pozzolanic agent is added to the blended mixture so as to control the rate of solidification of the mixture. The pozzolanic agent may be cement kiln dust, fly ash or any other pozzolanic substance. These pozzolanic agents are added at rates sufficient to prevent the premature occurrence of the cementation reaction.

The combination of the microencapsulating reagent, the pozzolanic agent, the high heating value waste material, and the cellulosic material causes a physiochemical reaction to occur during the blending. This physiochemical reaction involves diffusion, adsorption, hydration, chemisorption, molecular cross-linking, and other reactions that produce a monolithic material with high structural strength and very small leaching potential. Ideally, the reagent, along with the rest of the components of the present invention, fixes the inorganic and organic wastes in the liquid, solid or slurry state. The reagent increases the mixture's viscosity, acting as an effective interparticle lubricant, which accelerates the homogenization of the mixture while simultaneously decelerating the diffusivity of the other components in the mixture. Physically and chemically, the inorganic components of the mixture are entrapped within a matrix of the solidified mixture. Some of the fine inorganic particles are physically encapsulated within the macro and micro pores of the matrix, and some of the metals adhere to or adsorped loosely on the surface of the crystals and the particles of the pozzolanic agent. The remaining inorganic components are incorporated into the crystalline structure through ion exchange, substitution, solid solution and complex formation. Entrapment and encapsulation of inorganic components are enhanced naturally by the cage-like structure formed by the cross-linkage between the molecules of the microencapsulation reagent and the surfaces of such inorganic components.

Some of the dissolved or dispersed waste organic components are entrapped physically and encapsulated in the macro and micro pores of the matrix of the mixture or adsorbed or chemisorbed on the surfaces of these pores through dipole-dipole interaction, London force attraction, or hydrogen bonding. The rest of the organic waste components are incorporating chemically into the matrix through a variety of processes including, but not limited to, complex formation, chemical (covalent) bonding, and cross-linkage formation. The reagent utilized by the present invention largely overcomes the tendency of organic waste components to inhibit the cementation reaction.

After the pozzolanic agent is introduced at a constant rate to the mixture, the mixture is passed from the mechanical blender. The resultant blend can be pelletized and allowed to cure for transportation to the end user. Typically, the pellets are extruded when the wastes are viscid. Following extrusion, these extruded pellets are then given a final coating of a pozzolan so as to retain the full BTU values of the newly constructed fuel supplement. This coating also prevents the pellets from adhering to each other during the curing cycle. The final step to this process is to cure the pellets so that they have reached the strength of between fifty and one hundred pounds per square inch. Once the pellets are cured, they are ready for safe truck transportation to a kiln or power plant.

Under the present law, it is important that pollutants cannot migrate from the product. By blending the microencapsulation reagent with the mixture and by adding the final pozzolan coating, vapor release is prevented even in hot weather and during extended storage. As a result, the material can be stored outdoors subject to nature's elements.

In the inventors' laboratory, a sample of oil tank bottoms containing ten percent to twenty percent crude with eighty percent to ninety percent oil saturated silica sludge was shown to have BTU values of 7,200 to 9,800. The oil product tested at 8,700 to 9,800 BTU and the sludge tested at 7,200 to 7,900 BTU. When this waste was blended with two-and-a-half gallons of the microencapsulation reagent, twenty percent ground rice hulls, and ten percent (10%) cement kiln dust, the BTU values ranged from 7,400 to 8,900. When the amount of rice hulls was increased to twenty-five percent (25%), thirty percent (30%) and thirty-five percent (35%), the mean average was 8,600 BTU. What this indicates is that all values are above the required 5,000 BTU level.

The solidification and pelletization produce an ideal fuels program product. Initially, the material used was hazardous waste. By the process of the present invention, this hazardous waste is now converted to a form which prevents the migration of pollutants. These pellets can be added to the coal fuel supply without concern for deterioration by weather. The blending with the microencapsulation reagent and the final pozzolan coating prevent vapor release even in the hottest of weather or during extended storage.

In terms of the use of the product by customers, the product is an ideal fuel supplement. The BTU value of the pellets is stable and predictable. These pellets can be handled with the same material handling equipment used for the raw feed stock without modification. The pellets are economical and will contain the very silicas which the kiln normally must purchase as a necessary ingredient for their production. As such, the method of the present invention allows a use of hazardous waste materials in ongoing commercial operations. This will result in a significant reduction in the cost of the fuel utilized by cement kilns and other operations. In addition, this solves an otherwise difficult hazardous waste disposal problem.

The foregoing disclosure and description of the invention are illustrative and explanatory thereof. Various changes in the details of the composition of the present invention and in the details of the process of the present invention may be made within the scope of the appended claims without departing from the true spirit of the invention. The present invention should only be limited by the following claims and their legal equivalents.

We claim:

1. A method of preparing a high heating value fuel product comprising the steps of:
   blending a high heating value waste material with a cellulosic material;
   mixing an organic reagent to the blended mixture of said waste material and said cellulosic material, said organic reagent being a mixture having a 4–15 weight percent of a chemical selected from the group consisting of: triethylene glycol, diethylene glycol, and glycerin propylene glycol;
   introducing a pozzolanic agent to the blended mixture for controlling the rate of solidification; and
   forming said blended mixture into a form suitable for handling.

2. The method of claim 1, said high heating value waste material being a material having a heating value of greater than seven thousand BTU.

3. The method of claim 1, said waste material being a complex mixture of organic hazardous waste streams.

4. The method of claim 1, said cellulosic material being a particulate material having a high heating value.

5. The method of claim 4, said cellulosic material having a size suitable to allow at least eighty percent to pass through a ten mesh sieve.

6. The method of claim 5, said cellulosic material having a material selected from the group consisting of: rice hulls, wood shavings, sawdust, ground corncobs, grain dust, and cotton gin waste.

7. The method of claim 1, said mixture of said organic reagent further comprising:
   a 20–32 weight percent calcium chloride solution.

8. The method of claim 1, said pozzolanic agent being added to said mixture at a constant rate.

9. The method of claim 8, said pozzolanic agent being a substance selected from the group consisting of: cement kiln dust and fly ash.

10. The method of claim 1, said step of forming comprising:
    extruding said blended mixture into a plurality of pellets.

11. The method of claim 10, further comprising the steps of:
    coating said plurality of pellets with a pozzolanic coating; and
    curing said pellets to a desired strength.

12. The method of claim 1, said cellulosic material being a silica-containing material.

13. A method of preparing a fuel product comprising the steps of:
    blending a mixture of an organic hazardous waste stream with a cellulosic material;
    mixing a cross-linking reagent to said mixture, said cross-linking reagent being a chemical selected from the group consisting of: triethylene glycol, diethylene glycol, and glycerin propylene glycol;

blending said mixture and said cross-linking reagent such that cross-linking occurs with organics contained within; and forming said blended mixture into a form suitable for handling.

14. The method of claim 13, said step of forming further comprising:

extruding said blended mixture into a plurality of pellets; and coating said plurality of pellets with a pozzolanic material 15. The method of claim 14, further comprising the steps of:

curing said pellets to a desired strength.

16. The method of claim 13, said hazardous waste stream having a heating value greater than 7,000 BTU.

17. The method of claim 13, said cellulosic material being a particulate material having a heating value of greater than 5,000 BTU.

18. The method of claim 13, said chemical of said cross-linking reagent being 4–15 weight percent in solution.

19. The method of claim 13, further comprising the step of:

adding a pozzolanic agent to said blended mixture at a constant rate so as to control the rate of solidification.

20. The method of claim 13, said cross-linking reagent further comprising:

a 20–32 weight percent calcium chloride solution.